May 17, 1966 M. J. IOVENKO 3,251,927
CONDUCTOR WITH PLASTIC FABRIC LAMINATED INSULATION
Filed Jan. 21, 1963 3 Sheets-Sheet 1
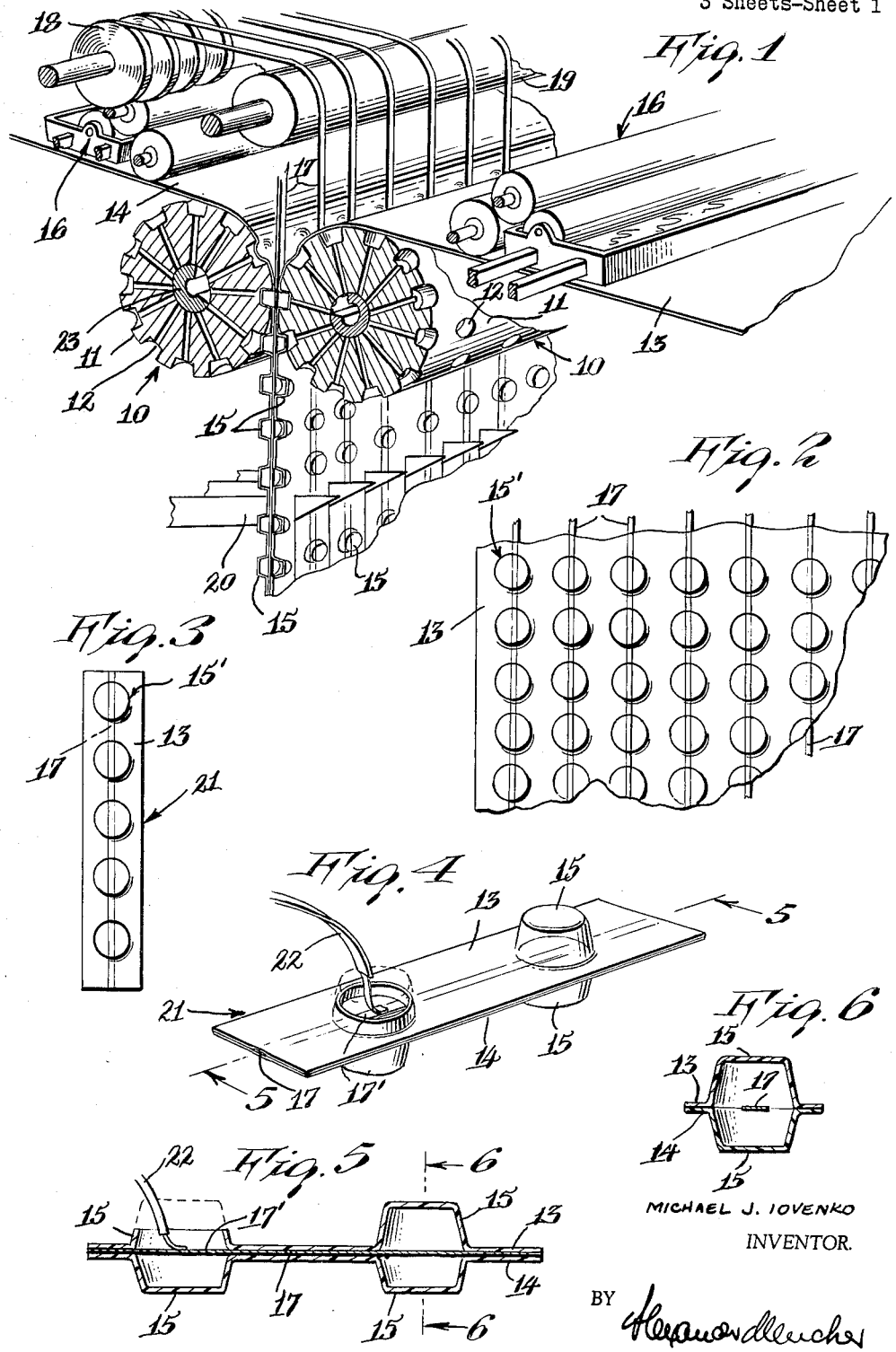
MICHAEL J. IOVENKO
INVENTOR.
BY
ATTORNEY

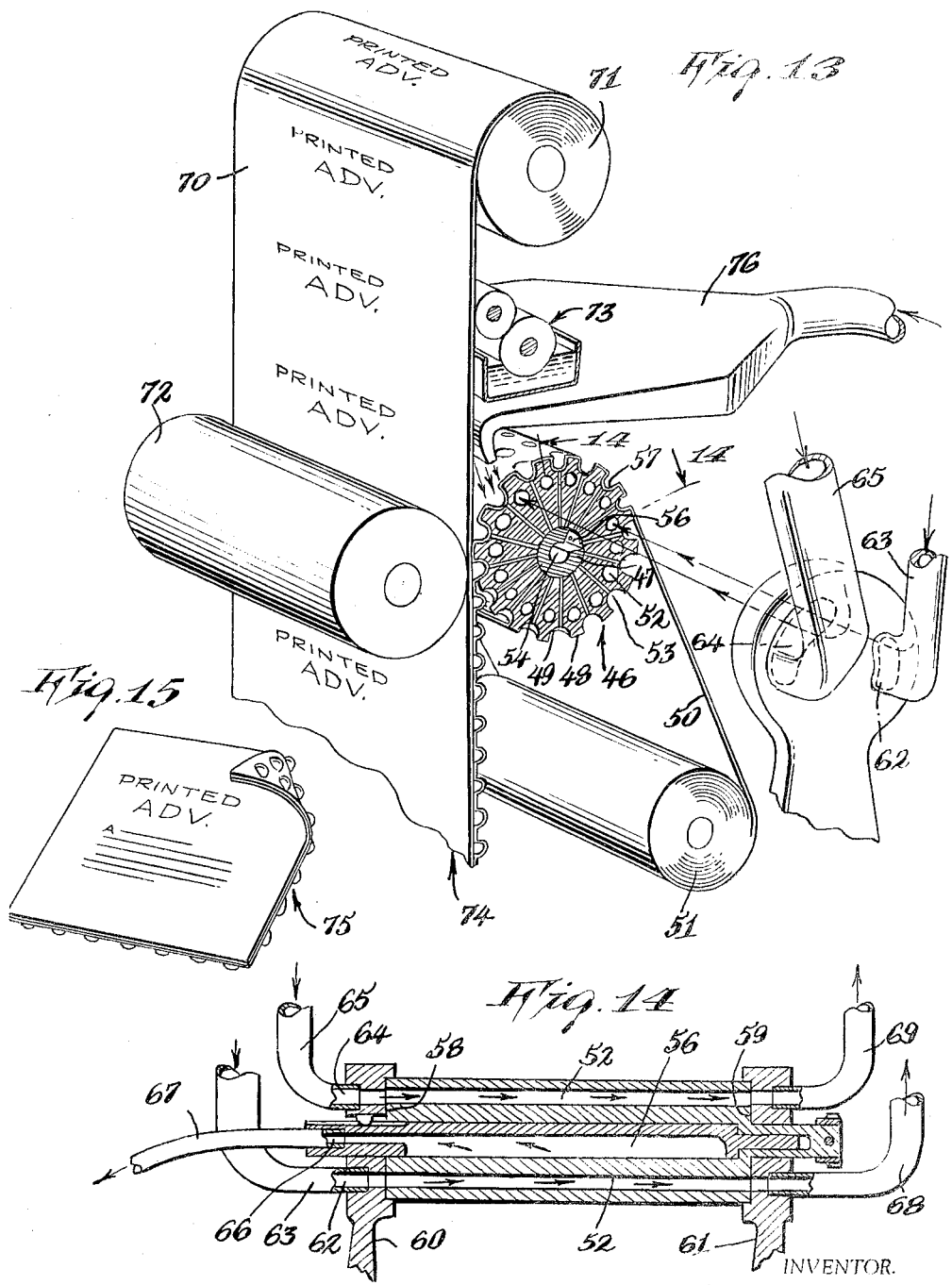

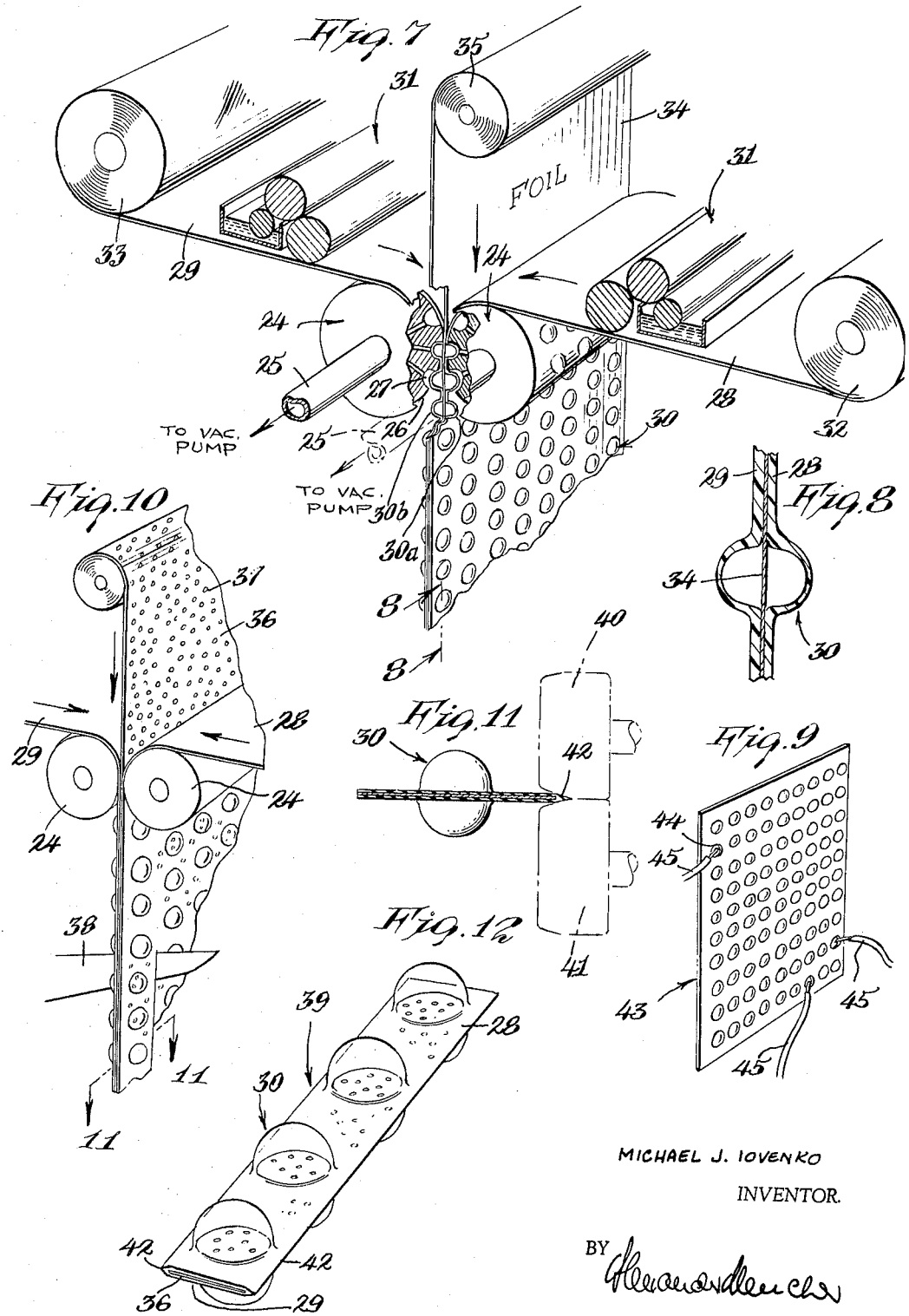

United States Patent Office 3,251,927
Patented May 17, 1966

3,251,927
CONDUCTOR WITH PLASTIC FABRIC
LAMINATED INSULATION
Michael J. Iovenko, New York, N.Y., assignor of fifty percent to Alexander Mencher, Forest Hills, N.Y.
Filed Jan. 21, 1963, Ser. No. 252,744
5 Claims. (Cl. 174—117)

This application is a continuation-in-part of applicant's copending application on Modified Plastic Tubing and Method of Production, filed in the U.S. Patent Office on January 4, 1962, under Ser. No. 165,062, and of applicant's copending application on Unwoven Plastic Fabrics, filed in the U.S. Patent Office on May 18, 1962, under Ser. No. 195,750.

This invention relates generally to methods and equipment for production and end products of plastic fabric laminations involving at least one ply or laminate of processed plastic sheet and film. A species of said ply or laminate is specifically shown and claimed in U.S. 2,955,044 and dated October 4, 1960.

More specifically, the invention relates to production and end products of a flexible and resilient laminated fabric having sealed chambers or pockets and additional selective laminations including metals, non-metals, fabric, composition, plastic and other materials.

An object of the invention relates to structures of novel products formed from thermoplastic film having spaced cavities and one or more laminations to seal said cavities and provide useful industrial and commercial products. A further object is to provide novel methods and equipment for production.

Another object of the invention is to provide a multichambered type of fabric having at least one lamination of flexible and resilient and multicavity thermoplastic film, and strands cuttable therefrom.

A further object of the invention relates to the production of laminated products embodying at least one lamination of flexible and resilient multicavity thermoplastic film or sheet, other laminations of metallic and non-metallic materials contributing to the nature and formation of the products. Such products are all characterized by interspersed sealed chambers or pockets and include: insulating wrapping material wherein a preprinted flat facing is of paper, plastic, or fabric; a capacitor or heating element wherein metallic film or sheet is an intermediate lamination between multicavity thermoplastic film or sheet laminations; a conductor strand or cable element wherein metallic film or sheet ribbon is an intermediate lamination element between multicavity thermoplastic film or sheet laminations.

These objects and other incidental ends and advantages of the invention will hereinafter appear in the progress of the disclosure and as pointed out in the appended claims.

Accompanying this specification are drawings showing preferred forms of the invention wherein:

FIGURE 1 is a fragmentary view in perspective partly in section showing means of production of one product of the invention;

FIGURE 2 is a fragmentary plan view of a resultant decorative or multiconductor product from operations shown in FIG. 1 before the cutting operation;

FIGURE 3 is a plan view of a section of a conductor or cable formed after the cutting operation;

FIGURE 4 is a view in perspective of a section of the conductor or cable showing an electrical connection with the metallic ribbon thereof through a perforated pocket wall;

FIGURE 5 is a sectional view of FIG. 4 through the plane 5—5 thereof;

FIGURE 6 is a sectional view of FIG. 5 through the plane 6—6 thereof;

FIGURE 7 is a fragmentary view in perspective partly in section showing means of production of a capacitor, heating, decorative or insulation fabric;

FIGURE 8 is a sectional view of FIG. 7 across the plane 8—8 thereof;

FIGURE 9 is a view in perspective showing a section of the fabric formed by structure of FIG. 7 with electrical connections through perforated pocket walls;

FIGURE 10 is a fragmentary view in perspective similar to that shown in FIG. 7 utilizing a perforated as distinguished from solid foil, and also showing cutting means;

FIGURE 11 shows a sectional view of a ribbon cut from the product of FIG. 11 and processed for fused edging by a pair of heated rollers shown in phantom;

FIGURE 12 is a view in perspective of a cut section of the fabric after edge sealing;

FIGURE 13 is a fragmentary view in perspective showing means of production of a fabric having a flat facing on one side;

FIGURE 14 is a sectional view of FIG. 13 across the plane 14—14 thereof; and

FIGURE 15 is a view in perspective showing a section of the product formed by the means of FIGURE 13.

In accordance with the invention and the preferred forms, FIGS. 1–6 indicate views showing the production of multilaminated products wherein the outer laminations are processed for multicavity formation and are tangentially secured with spaced intervening metallic or non-metallic ribbons.

Thus, a pair of similar rotary and multi-cavity registrable drums 10 each having die faces 11 and cavities 12 are shown in FIG. 1, each being fed runs of thermoplastic film or sheet 13 and 14 for fitting over the faces 11 and for drawing into the cavities 12 to form opposing chambers or pockets 15. Ply runs 13 and 14 are provided with similar and suitable adhesive applicators such as 16 for the adherable faces of the runs while a plurality of spaced metallic or non-metallic ribbons each indicated by numeral 17 are fed between the drums 10 for interleaving.

Ribbons 17 are suitably fed from rolls 18 over roller 19 and engaged between the drums 10 at the respective tangential areas for adhesive securement or sandwiching between the drawn runs of plies 13 and 14. As shown, the drawn cavities 15 are adapted to oppose each other while in drums 10 and have a larger diameter than the width of ribbons 17. The latter are aligned as shown to vertically and diametrically traverse the opposing cavity mouths prior to adhesion of the adjacent mouth areas. In this way, the ribbon portions free and inside of the pockets 15' formed by the junction of cavities 15 are untouched by adhesive situated on the inner walls of pockets 15' and applied by applicators 16.

The product descends below drums 10 in the form of laminated sheeting, a section of which is shown in FIG. 2. It may optionally be cut as by spaced knives 20 resulting in a ribbon type of product indicated by numeral 21 in FIG. 3. The products shown in FIGS. 2 and 3 lend themselves to electrical connections as by cutting away a wall portion of the pocket to expose the bare metallic and free ribbon portion. Thus in FIG. 4 is shown ribbon portion 17' connected to a conductor such as 22 in ribbon form. Although not shown, conductors may be similarly applied to the ribbons shown in FIG. 2.

Although adhesives such as solvents, dope or polymerizable cements are illustrated as means for laminating plastic film or sheet plies 13 and 14 and ribbons 17 before subjection of said plies to vacuum drawing as by means of vacuum distributor drum axles 23, lamination may be effected by an alternate heating and cooling procedure at the tangential areas of the drums 10 and ribbons 17 by a dwelling in the rotation of the drums.

The sheet or film of plies 13 and 14 may be of similar or different thermoplastic material and of similar or different gauge. The material is selective for property requirements and includes styrene polymers and copolymers, acrylics, cellulosics, polyolefins (polyethylene and polypropylene), vinyls, nylons, acetals, chlorinated polyether, polycarbonates, some polyurethanes, fluorocarbons, and other synthetic thermoplastic materials.

Ribbons 17 when formed of an electrically conducting metallic foil such as copper, aluminum, silver, alloy and the like is capable of serving as an insulated cable in elongated strip form as indicated by numeral 21 or as a plural type of conductor wherein the ribbons 17 are in spaced relationship and capable of being used for independent circuits or connected in series or in parallel for known electronic purposes or as heating elements. The products utilizing metallic ribbons 17 have excellent electric and dielectric properties, the latter being enhanced by the utilization of combined and alternating air or gas pockets 15' and laminate portions 13 and 14.

Ribbons 17, where formed of non-metallic material such as decorative stripping or even elastic material of rubber or plastic (the latter maintained in stretched condition during the lamination operation), contribute to production of decorative and elastic products when production follows the procedure of FIGS. 1–6. Moreover the formed pockets 15' may be under inflated pressures in excess of atmospheric pressure as by production taking place under pressures beyond 16 pounds per square inch; and the sizes of the pockets may also vary for desired purposes.

In FIGS. 7–12 are views showing the production of multilaminated products wherein the outer laminations are processed for multicavity formation and are tangentially secured with spaced intervening sheets or foils instead of ribbons as shown in FIGS. 1–6.

Thus, similar rotary and registrable multi-cavity drums 24 (as in FIGS. 1–6) are mounted on hollow axles 25, and each have die-faces 26 and cavities 27. These drums are fed runs of thermoplastic film or sheet 28 and 29 for fitting over said faces 26 and for drawing into the cavities 27 to form opposing chambers or pockets 30. Ply runs 28 and 29 are provided with similar and suitable adhesive applicators such as 31 for the adherable faces of the runs coming off rolls 32 and 33 while a run of metallic or non-metallic foil or sheet 34 off roll 35 is fed between the drums for interleaving. Foil or sheet 34 may be perforated for desired purposes as indicated in FIGS. 10 and 12 by numeral 36, each of the perforations being indicated by numeral 37.

The foil or sheet 34 is suitably fed (as in FIGS. 1–6) from roll 35 and engaged between the drums 24 at the respective tangential areas for adhesive securement or sandwiching between the drawn runs of plies 28 and 29. As shown, the drawn cavities 30a and 30b of the pockets 30 are adapted to oppose each other while in the drums 24. The portions of the foil or sheet 34 free and inside of pockets 30 formed by the junction of cavities 30a and 30b are untouched by adhesive situated on the inner walls of pockets 30 as applied by applicators 31.

The product descends below drums 24 in the form of laminated sheeting as shown in FIG. 7. It may optionally be cut whether the foil or sheet 34 is perforated or not as by one or more spaced knives 38 as shown in FIG. 10 resulting in a ribbon type of product indicated generally by numeral 39 in FIG. 12. When cut, the cut longitudinal edges may be passed through a pair of chamfered and heated rollers such as 40 and 41 to fuse the thermoplastic material around the edges of the exposed metal interleaving as at edge 42 shown in FIG. 11 to afford proper electrical insulation. The product shown in FIG. 9 and indicated generally by numeral 43 also lends itself to electrical connections as by cutting away a wall portion of the pocket as at 44 to expose the bare metallic portion to a connecting conductor as indicated by numerals 45.

The considerations, variables, and purposes described and applied to the structures, procedures and elements of FIGS. 1–6 apply to FIGS. 7–12 in all respects.

FIGS. 13–15 are views showing the production of a multi-cavity thermoplastic fabric and simultaneously therewith the lamination of a preprinted plastic, paper or other type of sheeting against the cavity mouths to provide a new type of packaging material.

Thus, a rotary drum 46 is provided mounted on a hollow axle 47. The drum has die faces 48 and cavities 49 for feeding therearound thermoplastic film or sheet 50 from roll 51. Drum 46 along the length is provided both with circularly arranged longitudinal bores 52 and radially disposed bores 53 leading from the drum axial bore 54 to each of the cavities 49.

The drum 46 rotates on the hollow axle 47 adapted to be connected to a vacuum pump, said axle having a slot 56 along the length thereof in about the upper right quadrant area as shown in FIG. 13 to exhaust the air from those cavities 49 intermittently communicating with said slot through bores 53. In this way thermoplastic sheet or film 50 is processed for conversion to a multicavity fabric wherein the cavities are indicated each by numeral 57. However, to properly orient the drawn sheet or film 50, the latter is heated at the drawing regions as by introducing hot air or fluid through longitudinal bores 52 in the right quadrant areas as shown and then successively introducing cold air or fluid through longitudinal bores 52 in the upper left quadrant area for counterclockwise rotation of drum 46.

Suitable structure for this type of combined vacuum drawing and orientation is best shown in FIGS. 13 and 14, and is also applicable to the drum structures shown in FIGS. 1, 7 and 10.

Thus, the end walls of drum 46 bear against orificed bearing faces 58 and 59 of standards 60 and 61. Bearing face 58 at an orifice communicates with the open end 62 of a hot air or fluid conduit 63 to feed a series of bores 52 in the upper right quadrant while at another orifice communicates with the open end 64 of a cold air or fluid conduit 65 at about the upper left quadrant for feeding bores 52 thereat all as viewed in FIG. 13. At another orifice of bearing face 58, there is a communication with end 66 of a vacuum line 67 for exhausting the cavities 49 in the upper right quadrant area.

Bearing face 59 of standard 61 has orifices communicating with return hot and cold lines 68 and 69 as shown in FIG. 14.

The multicavity fabric as formed by the structure shown and described in FIG. 13 is adapted to be laminated to paper plastic or other type of sheeting so that a product results with the cavities 57 of the fabric sealed.

For such purpose, sheeting 70 preprinted with advertising, design or the like if desired, is drawn from roll 71 and suitably fed in any direction, but vertically and downwardly as shown in FIG. 13 between a pressure roller 72 and the already processed fabric rotating on drum 46. Adhesive is applied as shown by an applicator 73 to the inner side of sheeting 70. The completed product 74 is drawn off as shown. A section of such product is indicated by numeral 75 in FIG. 15.

Preliminary to lamination between sheeting 70 and the processed fabric, a blower such as 76 may be utilized to give the fabric cavities 57 an excess of pressure for trapping by the sheeting 70. Or in the absence of a blower 76, the lamination process may be practiced in an environment under pressure in excess of atmospheric pressure.

The product 75 as shown in FIG. 15 is especially adapted for wrapping material having a pneumatic inner lining and a smooth outer wall containing advertising material. The material may also be used for insulated receptacle construction by varying the gauge and material of the elements used.

Any one or more of the plies used for laminating purposes may be suitably coated, or be in itself a lamination, or otherwise be treated to improve physical, chemical, electrical and other characteristics of the end laminated product. Moreover, the metallic ply in ribbon or sheet form may be of suitable gauges; but for electrically conducting purposes, the flexible form up to 10 mils in gauge is preferable. Corresponding or varying gauges for the thermoplastic or other plies are resorted to to meet suitable needs.

It is understood that the structures, equipment and methods described for each of the species of the invention shown may be applied to the other species wherever applicable, and that minor changes and variations in the material, gauge, shape, size of parts and other particulars with respect to structure, equipment and process may all be resorted to without departing from the spirit of the invention and the scope of the appended claims.

I claim:

1. A flexible and resilient electrical conductor having insulating to reduce dielectric loss, comprising a flat and flexible electrical conductor, a flexible and resilient insulating body therefor including a first and second member each formed of insulating plastic and each of which has formed therein a plurality of spaced cavities with solid portions therebetween, said first and second members being laminated together with said conductor sandwiched therebetween and with the mouths of the cavities in registration to form sealed air chambers, said conductor alternately crossing said sealed air chambers and the solid portions of the said members.

2. A flexible and resilient electrical conductor as set forth in claim 1 wherein said chambers are severable for making electrical contact with the conductor portions therewithin.

3. A flexible and resilient electrical conductor as set forth in claim 1 wherein said conductor is in the form of an elongated strip intermediate the width of said first and second members.

4. A flexible and resilient electrical conductor as set forth in claim 1 wherein said electrical conductor is in the form of a plurality of spaced elongated strips.

5. A flexible and resilient electrical conductor as set forth in claim 1 wherein said first and second members are formed of flexible thermoplastic film and wherein the walls of the cavities thereof are oriented.

References Cited by the Examiner

UNITED STATES PATENTS

| | | | |
|---|---|---|---|
| 2,410,744 | 11/1946 | Powers | 161—122 X |
| 2,413,032 | 12/1946 | O'Brien | 174—117 |
| 2,497,212 | 2/1950 | Donofrio | 18—56 |
| 2,579,390 | 12/1951 | Mills | 18—56 |
| 2,621,139 | 12/1952 | Messing | 161—122 X |
| 2,776,451 | 1/1957 | Chavannes | 18—10 |
| 2,955,044 | 10/1960 | Tupper | 99—180 X |
| 2,978,006 | 4/1961 | Clemens | 161—127 X |
| 3,057,952 | 10/1962 | Gordon | 174—117 |
| 3,072,961 | 1/1963 | Gilbert | 18—10 |
| 3,096,131 | 7/1963 | Adams | 174—99 X |
| 3,103,061 | 9/1963 | Fonoroff et al. | |
| 3,113,820 | 12/1963 | Norden | 174—99 X |

FOREIGN PATENTS 548,555    6/1956    Belgium.

ROBERT K. SCHAEFER, *Primary Examiner.*

JOHN P. WILDMAN, LARAMIE E. ASKIN, JOHN F. BURNS, *Examiners.*

W. F. ZAGURSKI, D. A. KETTLESTRINGS,
*Assistant Examiners.*